(12) United States Patent
Yue et al.

(10) Patent No.: US 11,936,135 B2
(45) Date of Patent: Mar. 19, 2024

(54) AUTOMATIC TRIPPING AND ANTI-FALLING ARRESTER AND A LIGHTNING PROTECTION AND FUSE INTEGRATED COMBINATION DEVICE

(71) Applicant: Shaanxi Heshuo Electric Co., Ltd., Shaanxi (CN)

(72) Inventors: Xihao Yue, Shaanxi (CN); Chunyu Zheng, Shaanxi (CN)

(73) Assignee: Shaanxi Heshuo Electric Co., Ltd. (CN)

( * ) Notice: Subject to any disclaimer, the term of this patent is extended or adjusted under 35 U.S.C. 154(b) by 311 days.

(21) Appl. No.: 17/610,436

(22) PCT Filed: Jun. 17, 2020

(86) PCT No.: PCT/CN2020/096601
§ 371 (c)(1),
(2) Date: Nov. 10, 2021

(87) PCT Pub. No.: WO2021/004244
PCT Pub. Date: Jan. 14, 2021

(65) Prior Publication Data
US 2022/0209458 A1 Jun. 30, 2022

(30) Foreign Application Priority Data

Jul. 8, 2019 (CN) .......................... 201910609720.0
Jul. 9, 2019 (CN) .......................... 201910612771.9

(Continued)

(51) Int. Cl.
*H01R 13/62* (2006.01)
*H01C 7/12* (2006.01)

(52) U.S. Cl.
CPC ......... *H01R 13/6205* (2013.01); *H01C 7/126* (2013.01)

(58) Field of Classification Search
CPC ........................... H01R 13/6205; H01C 7/126
See application file for complete search history.

(56) References Cited

U.S. PATENT DOCUMENTS 3,631,323 A * 12/1971 Pittman .................... H02H 9/06
  361/127
3,702,419 A * 11/1972 Carothers ................. H01T 1/15
  337/30

(Continued)

*Primary Examiner* — Thanh Tam T Le

(57) ABSTRACT

The present invention discloses an automatic tripping and anti-falling lightning arrester which includes an insulator main body, a lightning arrester body and an anti-falling member, wherein the insulator main body with a sealed cylinder structure, and a magnet adsorption surface inside the insulator main body; the lightning arrester body has a disconnection unit and a lightning arresting core respectively arranged from top to bottom, and the lightning arrester body is located inside the insulator main body, the disconnection unit includes a magnetic tripping module wherein a magnet is provided, and wherein the disconnection unit is adsorbed onto the magnet adsorption surface, wherein aging of the lightning arresting core results in a thermal effect inside the magnetic tripping module, which makes the disconnection unit disconnected from the magnet adsorption surface, and wherein the anti-falling member is provided on the insulator main body.

19 Claims, 16 Drawing Sheets

(30) Foreign Application Priority Data

Dec. 25, 2019 (CN) .......................... 201911351440.0
Jun. 8, 2020 (CN) .......................... 202010512467.X

(56) References Cited

U.S. PATENT DOCUMENTS

| | | | | |
|---|---|---|---|---|
| 4,001,651 A * | 1/1977 | Kershaw, Jr. | ............ | H01T 1/15 |
| | | | | 361/127 |
| 4,467,387 A * | 8/1984 | Bergh | ................ | H01C 7/12 |
| | | | | 361/127 |
| 4,736,272 A * | 4/1988 | Kato | ................ | H01T 4/14 |
| | | | | 361/138 |
| 4,910,632 A * | 3/1990 | Shiga | ................ | H01T 1/15 |
| | | | | 361/127 |
| 4,930,039 A * | 5/1990 | Woodworth | ............ | H01C 7/12 |
| | | | | 361/127 |
| 4,992,906 A * | 2/1991 | Doone | ................ | H01C 7/126 |
| | | | | 361/127 |
| 5,088,001 A * | 2/1992 | Yaworski | ................ | H01C 7/12 |
| | | | | 338/21 |
| 5,113,306 A * | 5/1992 | Veverka | ................ | H01C 7/12 |
| | | | | 361/127 |
| 5,172,297 A * | 12/1992 | Imakoma | ................ | H01B 17/46 |
| | | | | 361/126 |
| 6,018,453 A * | 1/2000 | Daharsh | ................ | H01C 7/12 |
| | | | | 361/111 |
| 6,678,141 B2 * | 1/2004 | Schmidt | ................ | H01B 17/46 |
| | | | | 361/128 |
| 7,701,688 B2 * | 4/2010 | Jeon | ................ | H02G 13/40 |
| | | | | 361/111 |
| 9,407,088 B2 * | 8/2016 | Sulitze | ................ | H01T 4/04 |
| 10,460,858 B2 * | 10/2019 | Khatri | ................ | H01C 1/028 |
| 10,637,184 B2 * | 4/2020 | Baek | ................ | H01R 13/621 |

* cited by examiner

AUTOMATIC TRIPPING AND ANTI-FALLING ARRESTER AND A LIGHTNING PROTECTION AND FUSE INTEGRATED COMBINATION DEVICE

TECHNICAL FIELD

The present invention relates to the technical field of power transmission and distribution, and more particularly relates to an automatic tripping and anti-falling arrester and a lightning arresting and fusing integrated combination device.

BACKGROUND ART

In the power industry, a RW series drop-out fuse and a MOA series zinc oxide lightning arrester generally needs to be installed at an offline location in a 10 kV distribution network terminal to provide overcurrent and lightning protection for a distribution transformer. The drop-out fuse is a type of common power equipment with isolation and protection properties in the power industry, which is mainly characterized in that a melt is fused by heat generated by a current when the current exceeds a fuse rating. At the same time, the drop-out structure disconnects a fusion tube body from a system power supply by means of the gravity, to form an obvious disconnection distance. A zinc oxide lightning arrester is a kind of power equipment used to protect electrical equipment from high transient overvoltage hazards. The lightning arrester is installed and connected between a power supply line and the ground, and is usually used in parallel with protected equipment. When the power supply line or equipment is operating under a normal rated working voltage, the lightning arrester is regarded to enter a high-impedance disconnected state to the ground. Once a high voltage occurs and endangers the insulation of the protected equipment, the lightning arrester immediately releases an overvoltage action to the earth and directs the high-voltage impact to the ground, thereby limiting a voltage amplitude and protecting the self-insulation between a power supply cable and the equipment. When the overvoltage disappears, the lightning arrester quickly returns to its original state, allowing the power supply line to operate normally.

An existing power grid fusing and lightning arresting device is generally mounted by adopting a typical installation method in which double poles and double crossarms enter from the top and exit from the bottom. It is necessary to install a metal crossarm separately, and then install the lightning arrester on the crossarm. The lightning arrester must to be removed after aging and falling off. This installation method not only increases the complexity and cumbersomeness of the drop-out fuse and the zinc oxide lightning arrester during the installation process. In addition, when the zinc oxide lightning arrester fails or loses its efficacy, it cannot be safely disconnected from the system in time, which increases the workload of operation and maintenance on the 10 kV side of a distribution network terminal.

Secondly, if the lightning arrester cannot be disconnected and replaced in time after aging, a lightning arrester body will heat up and may even explode, resulting a safety hazard. Therefore, it is necessary to install a disconnector. The current disconnectors are approximately divided into two types, i.e., a hot-melt type disconnector and a thermal-explosion type disconnector. The hot-melt type disconnector is characterized in that: when an internal valve core of a zinc oxide lightning arrester has an aging failure, a current flowing through a valve plate group increases, which makes the valve plate group form a heating state. When the heating temperature reaches a designed value of the disconnector, a low-melting-point alloy in the disconnector will be molten, and the disconnector actuates to enable the zinc oxide lightning arrester to be disconnected from a ground wire of the system. However, since the time consistency of the disconnection actions of the hot-melt type disconnector cannot meet the existing power grid operating status, it cannot be ensured that the lightning arrester will be disconnected from a main circuit within a short time. Nowadays, the hot-melt type disconnector is basically not used. The thermal-explosion type disconnector is characterized in that: when an internal valve core of a zinc oxide lightning arrester experience an aging failure, a current flowing through a valve plate increases; a power-frequency current is used to generate an electric arc through itself to ignite an explosive, so that the lightning arrester is disconnected from a ground wire. However, the thermal-expansion type lightning arrester has a relatively low safety factor and is relatively troublesome to operate since the thermal-explosion type disconnector needs to be powered off for replacement after falling off; and an internal explosive has a greater risk of safety management and control, which limits its promotion and use.

SUMMARY OF THE INVENTION

An objective of the present invention is to provide an automatic tripping and anti-falling lightning arrester and a lightning arresting and fusing integrated combination device, which achieves an automatic and reliable disconnection of an aged lightning arrester and fall prevention of a disconnected lightning arrester, to ensure the safety of a power grid, to facilitate the replacement of the lightning arrester, and at the same time to achieve the combined use of a lightning arrester and a fuse.

The present invention is mainly characterized in that: first, a disconnection way of the traditional lightning arrester is changed such that the lightning arrester is installed inside an insulator main body of a built-in magnetic thermal disconnection unit; the heat generated by the operation of the lightning arrester after the failure causes a magnet to lose its efficacy, so that the lightning arrester is further disconnected; and an anti-falling mechanism installed on an insulator holds the disconnected lightning arrester to avoid the safety impact caused by direct falling from a high place and facilitate the replacement of the lightning arrester.

The technical solution adopted by the present invention is as follows:

An automatic tripping and anti-falling lightning arrester, comprises an insulator main body, a lightning arrester body and an anti-falling member, wherein the insulator main body has a sealed cylinder structure, and a magnet adsorption surface is provided inside the insulator main body; the lightning arrester body comprises a disconnection unit and a lightning arresting core which are provided from top to bottom, and the lightning arrester body is provided in the insulator main body; the disconnection unit comprises a magnetic tripping module in which a magnet is provided, and the disconnection unit is adsorbed onto the magnet adsorption surface when in operation; the aging of the lightning arresting core results in a thermal effect inside the magnetic tripping module, which makes the disconnection unit disconnected from the magnet adsorption surface; and the anti-falling member is provided on the insulator main body, and is configured to support and prevent the lightning arrester body from falling off when the lightning arrester body is disconnected from a working position and falls off.

The automatic tripping and anti-falling lightning arrester, the magnetic tripping module comprises a metal shell, and a magnet, a resistor plate and a pot-shaped conductor plate which are sequentially stacked in the metal shell from top to bottom, wherein the resistor plate is closely clung to the pot-shaped conductor plate, and a discharge gap is formed between the outer wall of the pot-shaped conductor plate and the inner wall of the metal shell.

The automatic tripping and anti-falling lightning arrester, the magnetic tripping module further comprises a conductive jacking member, a conductive connecting screw and an insulated positioning pad, which are sequentially provided in the metal shell and located at the lower part of the pot-shaped conductor plate; the lower end of the conductive connecting screw passes through the insulated positioning pad and the bottom of the metal shell and extends to the outside of the metal shell; and a metal cover is mounted on the top of the metal shell.

The automatic tripping and anti-falling lightning arrester, the discharge gap is 2 mm.

The automatic tripping and anti-falling lightning arrester, the resistor plate is a silicon carbide resistor plate.

The automatic tripping and anti-falling lightning arrester, a conductive convex ring is provided at an outer ring at the middle and lower part of the lightning arrester body; the anti-falling member is a hook anti-falling component provided on one side of the bottom end of the insulator main body; and when the lightning arrester body falls off, the hook anti-falling component hooks the lower end of the conductive convex ring to prevent the lightning arrester body from falling off.

The automatic tripping and anti-falling lightning arrester, the hook anti-falling component comprises a fixed bracket and an anti-falling fixing member that are integrally connected to each other; the fixed bracket sleeves a lower port of an insulating tube at the lower end of the insulator main body; and a movable hook is movably connected to the lower end of the anti-falling fixing member through a torsion spring and a hook bolt.

The automatic tripping and anti-falling lightning arrester, a brim is provided at an outer ring on the top of the lightning arrester body; the anti-falling member comprises a bell-mouth main body and a claw-type washer; the bell-mouth main body is coupled to the lower port of the insulating tube at the lower end of the insulator main body; a claw-shaped washer is provided inside the bell-mouth main body; the claw-type washer comprises a mounting ring and a plurality of elastic claws provided at the lower part of the mounting ring; the top of each elastic claw is fixedly connected with the mounting ring as a whole; each elastic claw bends inward and forms a protrusion in the middle; the protrusion blocks the brim when the lightning arrester body falls off.

The automatic tripping and anti-falling lightning arrester, a mounting notch is provided on one side of a ring body of the mounting ring, and penetrates through the entire ring body.

The automatic tripping and anti-falling lightning arrester, a washer mounting groove and a washer movable groove are provided inside the bell-mouth main body from top to bottom; the mounting ring of the claw-shaped washer is mounted in the washer mounting groove; and the washer movable groove positionally corresponds to the protrusion.

The automatic tripping and anti-falling lightning arrester, the conductive convex ring is provided at the outer ring at the middle and lower part of the lightning arrester body; a limiting groove is formed inside the bell-mouth main body; and the conductive contact surface at the upper part of the limiting groove of the lightning arrester body is in contact with the conductive convex ring.

The automatic tripping and anti-falling lightning arrester, an upper umbrella skirt sealing member is provided at the top end of the insulator main body; the magnet adsorption surface is machined on the lower end surface of the upper umbrella skirt sealing member; and the disconnection unit at the upper end of the lightning arrester body is adsorbed onto the magnet adsorption surface.

The automatic tripping and anti-falling lightning arrester, the upper umbrella skirt sealing member is coupled to the top end of the insulator main body through threads.

The automatic tripping and anti-falling lightning arrester, an upper-end connecting member is provided at the top end of the upper umbrella skirt sealing member, and a wire inlet end is provided on the upper-end connecting member.

The automatic tripping and anti-falling lightning arrester, an intermediate fixing member is provided at the outer ring of the insulator main body; a magnet adsorption block is provided inside the insulator main body and fixed on the intermediate fixing member; the magnet adsorption surface is machined on the lower end surface of the magnet adsorption block; the disconnection unit at the upper end of the lightning arrester body is adsorbed onto the magnet adsorption surface.

The automatic tripping and anti-falling lightning arrester, the intermediate fixing member is fastened to a crossarm on an electric pole, and is connected to a ground terminal.

The automatic tripping and anti-falling lightning arrester, the insulator main body comprises an insulating tube which is sleeved with an umbrella skirt main body; and an insulating tube lower port is provided at the lower end of the umbrella skirt main body.

A lightning arresting and fusing integrated combination device, comprising a fuse and the automatic tripping and anti-falling lightning arrester, the upper-end fixing member is coupled to the upper part of the insulator main body and the upper part of the fuse; and the upper-end fixing member is connected with a high-voltage wire inlet end of an external power transmission line.

The lightning arresting and fusing integrated combination device, a lower-end fixing member is connected to the lower part of the insulator main body and the lower part of the fuse; the lower-end fixing member is fixed between the insulating tube lower port and the bell-mouth main body; and the lower-end fixing member is connected with a low-voltage wire outlet end of the external power transmission line and a wire inlet end of the lightning arrester.

The present invention has the following beneficial effects.

1. The lightning arrester of the present invention is provided with the magnetic disconnection unit and the anti-falling mechanism. During normal operation, the lightning arresting core is adsorbed onto a magnet adsorption surface through the built-in magnet of the disconnection unit, such that the lightning arresting core enters an operating state. After the lightning arresting core ages, the magnet is heated by a thermal effect generated by a magnetic tripping module of the disconnection unit and then loses its magnetism, which realizes the automatic and reliable disconnection of the aged lightning arrester and the fall prevention of the disconnected lightning arrester, ensures the use safety of the power grid and facilitates the replacement of the lightning arrester.

2. The magnet, the silicon carbide resistor plate and the pot-shaped conductor plate which are laminated are adopted in the disconnection unit of the lightning arrester, and the discharge gap is formed between the pot-shaped conductor plate and the metal shell of the disconnection unit, such that a voltage loaded on the silicon carbide resistor plate when the severely aged lightning arresting core operates will break down the discharge gap to form a discharge channel, causing the magnet to heat up quickly and lose its magnetism, such that the aged lightning arrester falls off, thereby ensuring the safety of the power grid.

3. In the present invention, the external anti-falling mechanism is provided at the bottom of the insulator main body, and the conductive convex ring is provided on the lightning arrester body. During normal operation, the conductive convex ring is in contact with the conductive contact surface on the bell-mouth main body to achieve the electric conduction. When the lightning arrester body falls off, the hook anti-falling component of the anti-falling member hooks the lower end of the conductive convex ring to prevent the lightning arrester body from falling off directly, thereby ensuring the safety of the power grid and facilitating the replacement of the lightning arresting core.

4. In the present invention, the built-in anti-falling mechanism is provided inside an insulator cavity of the lightning arrester. When the lightning arrester loses its efficacy and falls off, the claw-shaped washer located at the lower part of the insulator cavity blocks the brim on the top of the lightning arrester, thereby preventing the lightning arrester from falling off. In the case of sufficiently utilizing the length of the lightning arrester, the distance between the disconnected lightning arrester and the grounding terminal is the farthest, thereby ensuring that the lightning arrester can be effectively disconnected from the main line after the lightning arrester loses its efficacy, such that the safety distance is maximized. The claw-shaped washer is provided on one side to facilitate the penetration of the lightning arrester into the insulator cavity. Compared with the external anti-falling mechanism, the installation interference caused by the structure of a wire outlet end at a lower port is avoided, such that the components are simplified, the structure is attractive in appearance, and the production efficiency is improved.

5. In the present invention, the automatic tripping and anti-falling lightning arrester and the fuse are combined into a lightning arresting and fusing integrated combination device. The intermediate fixing member provided in the middle of the insulator main body is fixed on a crossarm on an electric pole, and the lower-end fixing member realizes the sharing of a low-voltage wire outlet end and a wire inlet end of the lightning arrester, thereby simplifying the structure and the installation and fixation manner of the split lightning arrester and fuse, and thus reducing the equipment cost.

Figure 1:
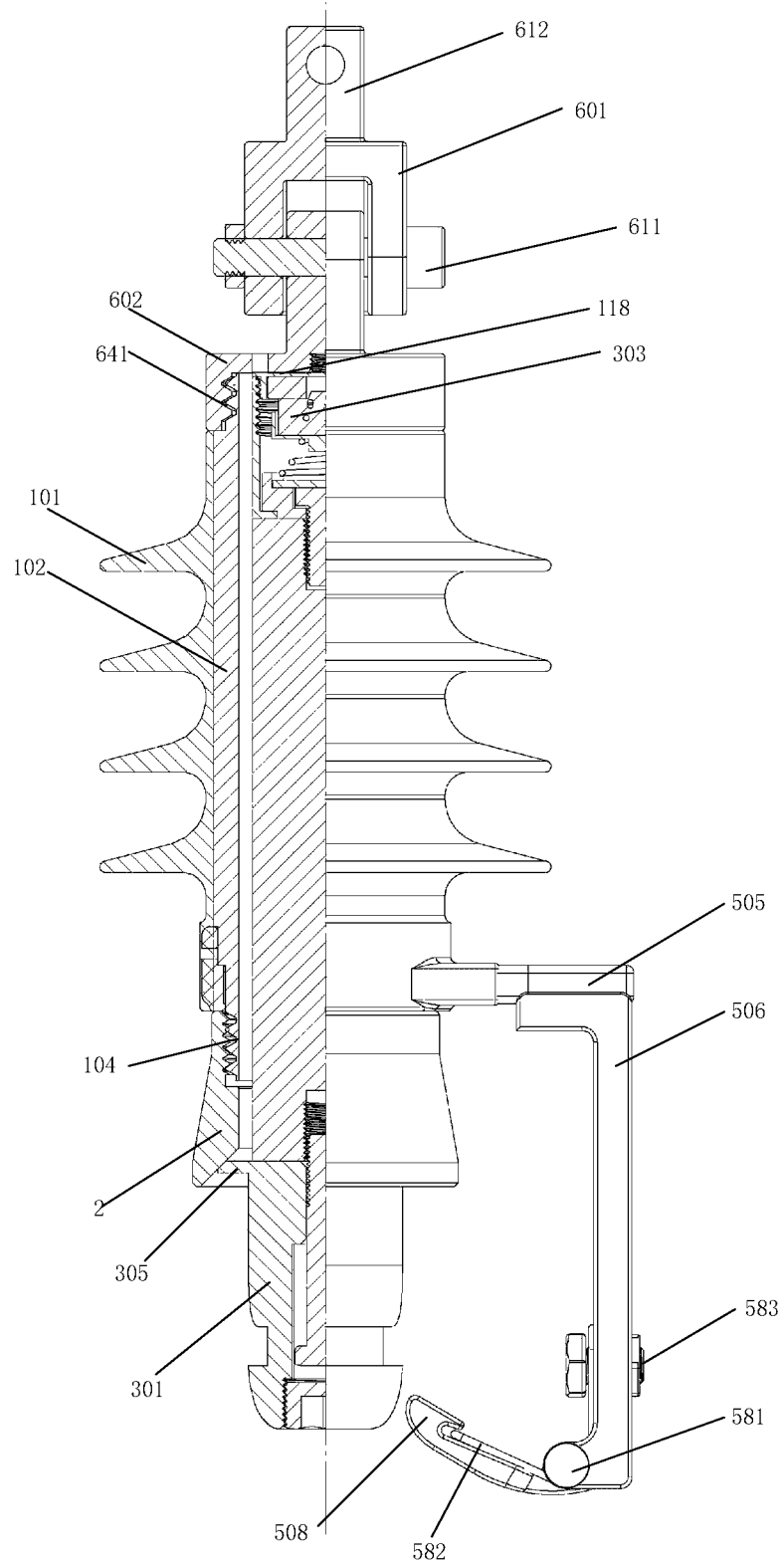
FIG. 1 is a structural composition diagram when an external anti-falling lightning arrester of the present invention operates normally.

Reference symbols represent the following components: 1—insulator main body; 2—bell-mouth main body; 3—lightning arrester body; 4—fuse; 101—umbrella skirt main body; 102—insulating tube; 103—insulating tube lower port; 104—tube bottom external thread; 105—upper-end fixing member; 106—lower-end fixing member; 107—intermediate fixing member; 108—magnet adsorption block; 109—positioning screw; 110—fuse fixing hole; 111—positioning hole; 118—magnet adsorption surface; 200—claw-type washer; 201—mounting thread; 202—washer mounting groove; 203—washer movable groove; 204—conductive contact surface; 205—mounting ring; 206—mounting notch; 207—elastic claw; 208—protrusion; 209—limiting groove; 210—elastic claw mouth portion; 301—extension rod; 302—lightning arresting core; 303—disconnection unit; 304—brim; 305—conductive convex ring; 311—metal shell; 312—metal cover; 313—magnet; 314—resistor plate; 315—pot-shaped conductor plate; 316—conductive jacking member; 317—conductive connecting screw; 318—insulated positioning pad; 320—discharge gap; 401—bolt; 402—fuse wire outlet end; 505—fixed bracket; 506—anti-falling fixing member; 508—anti-falling movable hook; 551—fixed collar; 581—hook bolt; 582—torsion spring; 583—torsion spring bolt; 601—upper-end connecting member; 602—upper umbrella skirt sealing member; 611—connecting stud; 612—wire inlet end; 641—tube top external thread.

DETAILED DESCRIPTIONS OF THE PREFERRED EMBODIMENTS

A lightning arrester functions as important device used to protect electrical equipment from high transient overvoltage hazards. The lightning arrester is mounted and connected between a power supply line and the earth, and is usually used in parallel with the protected equipment. When the power supply line or equipment is operating under a normal rated working voltage, the lightning arrester has no release effect on the earth, and is thus regarded to enter a high-impedance disconnected state to the earth. Once a high voltage occurs and endangers the insulation of the protected equipment, the lightning arrester made of a zinc oxide material immediately releases an overvoltage action to the earth and directs the high-voltage impact to the earth, thereby limiting a voltage amplitude and protecting the self insulation between a power supply cable and the equipment. When the overvoltage disappears, the lightning arrester quickly returns to its original state, allowing the power supply line to operate normally.

After the long-term use of the lightning arrester, there will inevitably be a problem in terms of service life. Once a device ages, the lightning arrester needs to be disconnected from a distribution network circuit in time. A hot-melt type disconnection manner is generally adopted for the lightning arrester. A hot-melt type disconnector is characterized in that: when an internal valve core of a zinc oxide lightning arrester has an aging failure, a ground terminal of the zinc oxide lightning arrester is disconnected, which is mainly manifested as an increase in the current flowing through a valve plate, making a valve plate group form a heating state. Since the valve plate group has a negative temperature coefficient, the equivalent resistance caused by heating decreases, which in turn promotes severe heating and forms a vicious circle. In this way, the zinc oxide lightning arrester directly transmits its working state to a disconnector in a form of temperature, and heats up by itself by using a power-frequency current. When this temperature reaches a designed value of the disconnector, a low-melting-point alloy in the disconnector is molten, and the disconnector actuates to enable the zinc oxide lightning arrester to be disconnected from a ground wire of the system, and the zinc oxide lightning arrester is then replaced.

The present invention focuses on the problems of long-term use and aging replacement of lightning arresters, and has develops an external anti-falling mechanism, a built-in anti-falling mechanism, an automatic tripping structure of a magnetic lightning arresting core and a lightning arresting and fusing combination device, which will be respectively introduced respectively in the following embodiments.

Embodiment 1: External Anti-Falling Lightning Arrester

Figure 2:
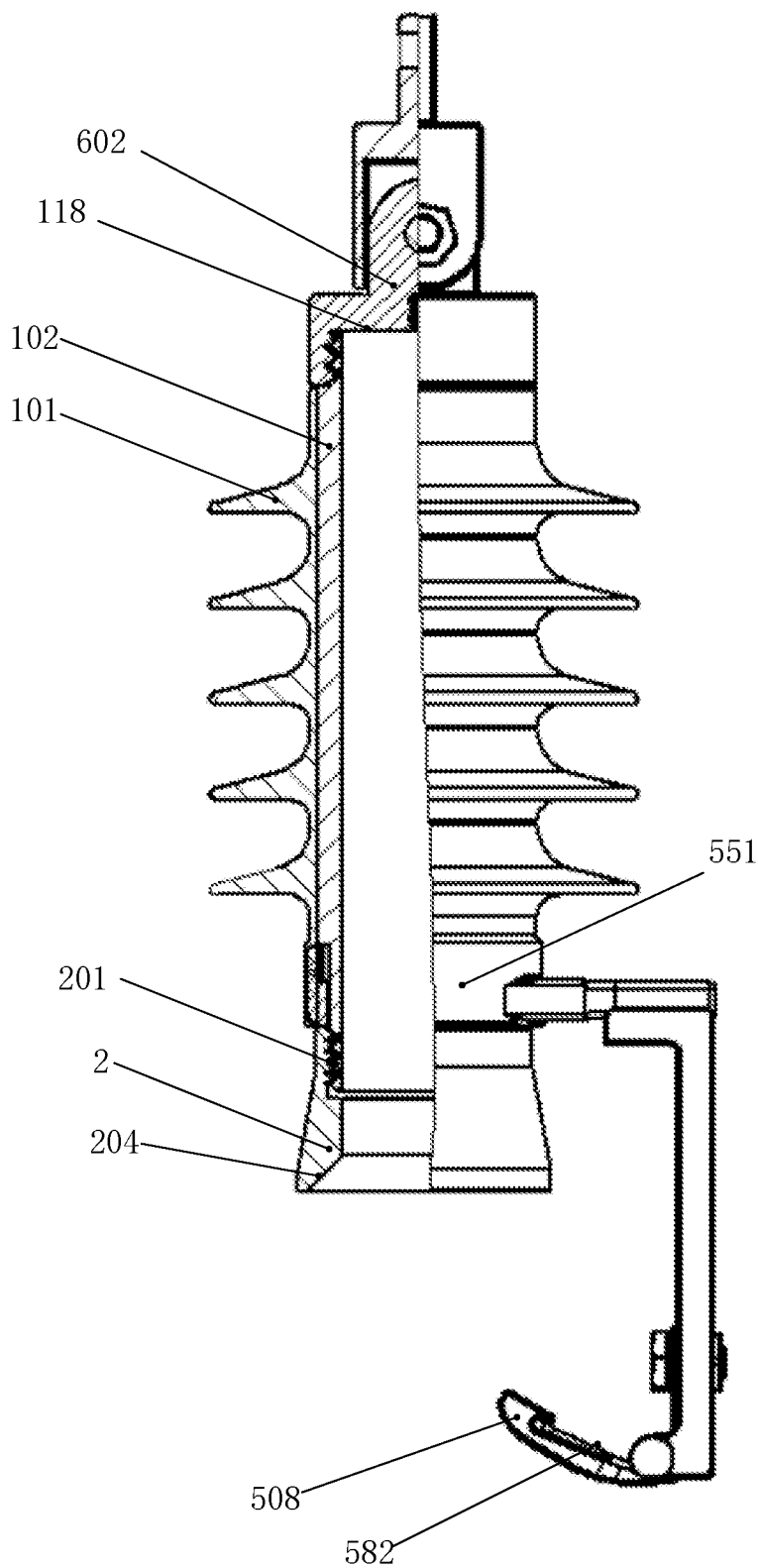
FIG. 2 is a structural composition diagram of an insulator main body and a bell mouth of the external anti-falling lightning arrester of the present invention.
Figure 3:
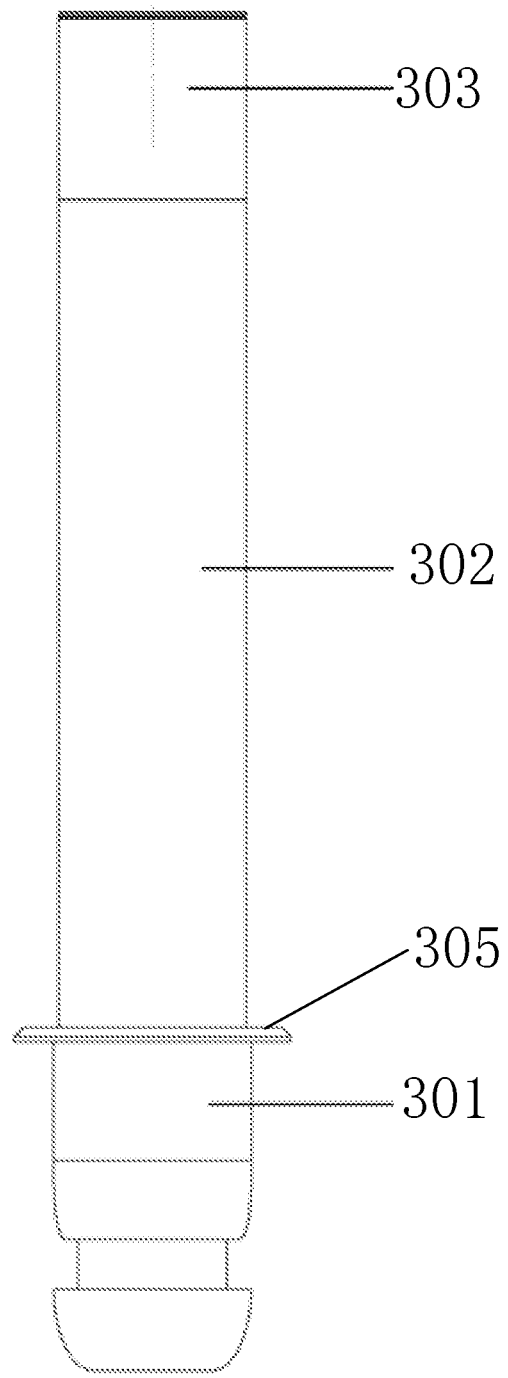
FIG. 3 is a structural composition diagram of an external anti-falling lightning arrester body of the present invention.

As shown in FIGS. 1-3, an automatic tripping and anti-falling lightning arrester includes an umbrella skirt main body 101, an insulating tube 102, a zinc oxide lightning arresting core 302, and a bell-mouth main body 2, wherein the insulting tube 102 is located inside the umbrella skirt main body 101, and the bell-mouth main body 2 is located at the bottom end of the umbrella skirt main body 101. An upper umbrella skirt sealing member 602 is provided at the upper end of the umbrella skirt main body 101. The lower surface of the upper umbrella skirt sealing member 602 is provided with a magnet adsorption surface 118. The lower end of the upper umbrella skirt sealing member 602 is provided with a mounting internal thread, and the insulating tube 102 is provided with a tube top external thread 641 that is matched with the mounting internal thread. The upper umbrella skirt sealing member 602 is fixedly connected to the umbrella skirt main body 101 through the insulating tube 102. A lightning arresting core mounting cavity is provided inside the insulating tube 102. The zinc oxide lightning arrester body 3 is mounted in the lightning arresting core mounting cavity. The lightning arrester body 3 includes a zinc oxide lightning arresting core 302 in the middle, a disconnection unit 303 at the upper end, and an extension rod 301 at the lower end. A conductive convex ring 305 is provided on the extension rod 301. An anti-falling mounting frame is connected to one side of the umbrella skirt main body 101. An anti-falling movable hook 508 is connected to one side of the bottom end of the anti-falling mounting frame. The anti-falling movable hook 508 is located at one side of the bottom end of the lightning arresting core. The anti-falling mounting frame includes a fixed bracket 505 and an anti-falling fixing member 506. A fixing collar 551 is connected to one end of the fixed bracket 505, and fixedly sleeves the connection between the umbrella skirt main body 101 and the bell-mouth main body 2. The anti-falling fixing member 506 is fixedly connected to the fixed bracket 505. A torsion spring 582 is provided on the anti-falling fixing member 506, and connected to the anti-falling fixing member 506 by a bolt. The fixed bracket 505 is closely clung to a bell mouth 2 through the fixing collar 551, which can ensure that overvoltage or lightning can be safely directed into the ground. At the same time, the fixing collar 551 effectively connects the insulating tube 102, and a ground wire from a wire outlet end may be connected to the anti-falling fixing member 506 through a torsion spring bolt 583.

The anti-falling movable hook 508 is located at one side of the bottom end of the anti-falling fixing member 506, and is connected to the anti-falling fixing member 506 through the torsion spring 582 and a hook bolt 581. When an operator manually installs the anti-falling movable hook 508, an installer is used to shrink the anti-falling movable hook 508 inward so that the zinc oxide lightning arrester body 3 is installed smoothly and returns to an original state. Therefore, when the zinc oxide lightning arrester core 302 ages and falls off, the lightning arrester body 3 can be stuck at an anti-falling position by using the anti-falling movable member 508, so as to prevent the lightning arrester body 3 from directly falling in other places and causing safety accidents.

The upper end of the bell-mouth main body 2 is provided with a mounting thread 201, and the side wall at the bottom end of the insulating tube 102 is provided with a tube bottom external thread 104 matching the mounting thread 201. A conductive contact surface 204 is provided at one end of the bell-mouth main body 2 with a larger diameter. The bell-mouth main body 2 and the insulating tube 102 may be tightly combined by means of the mounting thread 201, and the conductive contact surface 204 may be fully in contact with a conductive part at the lower end of the lightning arrester body 3, thereby ensuring the effective conduction therebetween. The bell-mouth main body 2 is made of a non-ferrous metal material. The conductive contact surface 204 has a 30° wide mouth, and is in contact with the extension rod 301 through the conductive convex ring 305. Since the bell-mouth main body 2 is made of the non-ferrous metal material, a magnet at the upper end of the lightning arrester body 3 can be prevented from being attracted accidentally during the installation process of the lightning arrester body 3. By designing the conductive contact surface 204 with the 30° wide mouth, the lightning arrester body 3 can be installed more easily.

An upper-end connecting member 601 is connected to the top end of the upper umbrella skirt sealing member 602, a wire inlet end 612 is provided at the upper end of the upper-end connecting member 601, and a connecting stud 611 is provided on the side wall of the upper-end connecting member 601. The upper end of the upper umbrella skirt sealing member 602 is provided with a mounting hole matched with the connecting stud 611. The upper umbrella skirt sealing member 602 is connected to the upper-end connecting member 601 through the connecting stud 611. The umbrella skirt main body 101 is connected to the upper-end connecting member 601 through the upper umbrella skirt sealing member 602, such that the umbrella skirt main body 101 can be rotated by 90° and has a certain connection effect.

The upper umbrella skirt sealing member 602 is made of an iron material, and a magnet adsorption surface 118 is machined on the lower end of the upper umbrella skirt sealing member 602. The magnet adsorption surface 118 is a flat circular surface, which provides an effective adsorption surface for the magnet inside the disconnection unit 303, such that they are fully in contact with each other for electrical conduction. In normal operation, the disconnection unit 303 is adsorbed onto the magnet adsorption surface 118. The aging of the lightning arresting core results in a thermal effect inside the magnetic tripping module, which makes the disconnection unit 303 automatically tripped from the magnet adsorption surface 118.

When in operation, the umbrella skirt main body 101 is movably connected to the upper-end connecting member 601 through the upper umbrella skirt sealing member 602, and is connected to an upper-end line through a wire inlet end 612 at the upper end of the upper-end connecting member 601. The bell-mouth main body 2 and the insulating tube 102 may be tightly combined through the mounting thread 201. At this time, the lightning arrester body 3 is installed inside the insulating tube 102, and the conductive convex ring 301 on the extension rod 301 is fully in contact with the conductive contact surface 204 to ensure the effective electric conduction therebetween. In addition, the fixed support 505 is tightly clung to the bell-mouth main body 2 through the fixing collar 551, and meanwhile, the anti-falling fixing member 506 is fixedly connected to the fixed bracket 505, and a ground line at the lower end is connected to the anti-falling fixing member 506 through the hook bolt 581, which can ensure that overvoltage or lightning can be safely directed into the ground.

Figure 4:
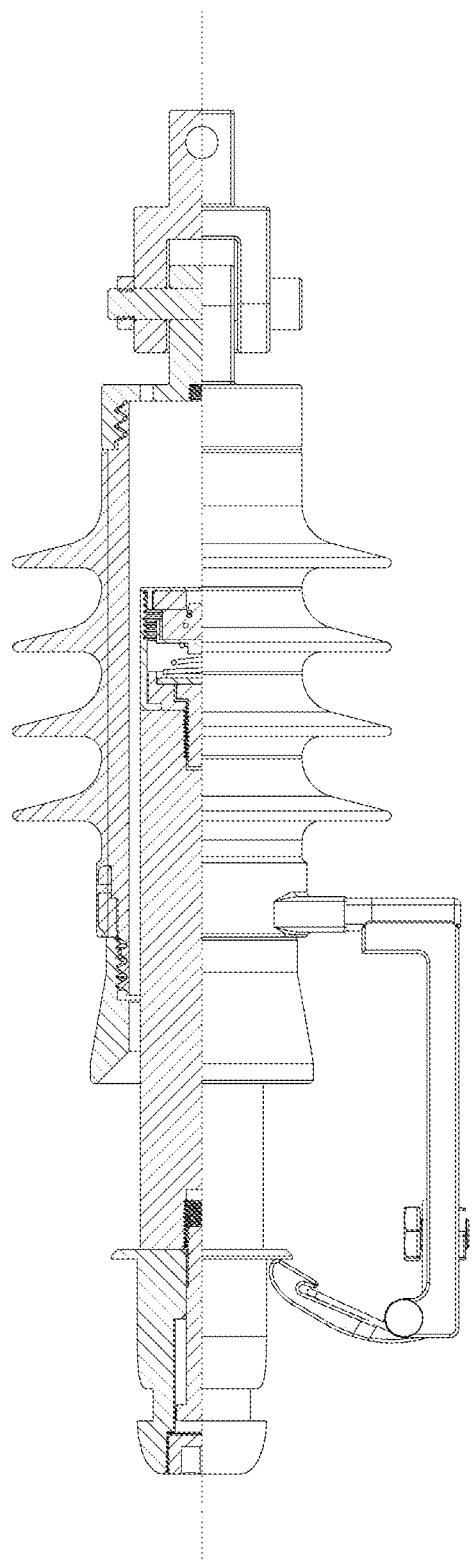
FIG. 4 is a structural diagram when the external anti-falling lightning arrester of the present invention ages and falls off.

As shown in FIG. 4, when the zinc oxide lightning arresting core 302 ages and falls off, the extension rod 301 and the conductive convex ring 305 fall off accordingly, such that the bottom end of the conductive convex ring 301 is in contact with the top end of the anti-falling movable hook 508. Therefore, the anti-falling movable hook 508 is used to support the conductive convex ring 301 of the lightning arrester body 3, such that the lightning arrester body 3 is stuck at an anti-falling position, thereby preventing the lightning arrester body 3 from directly falling in other places and causing safety accidents, with high safety and easy use.

Embodiment 2: Magnetic Tripping Module

Figure 5:
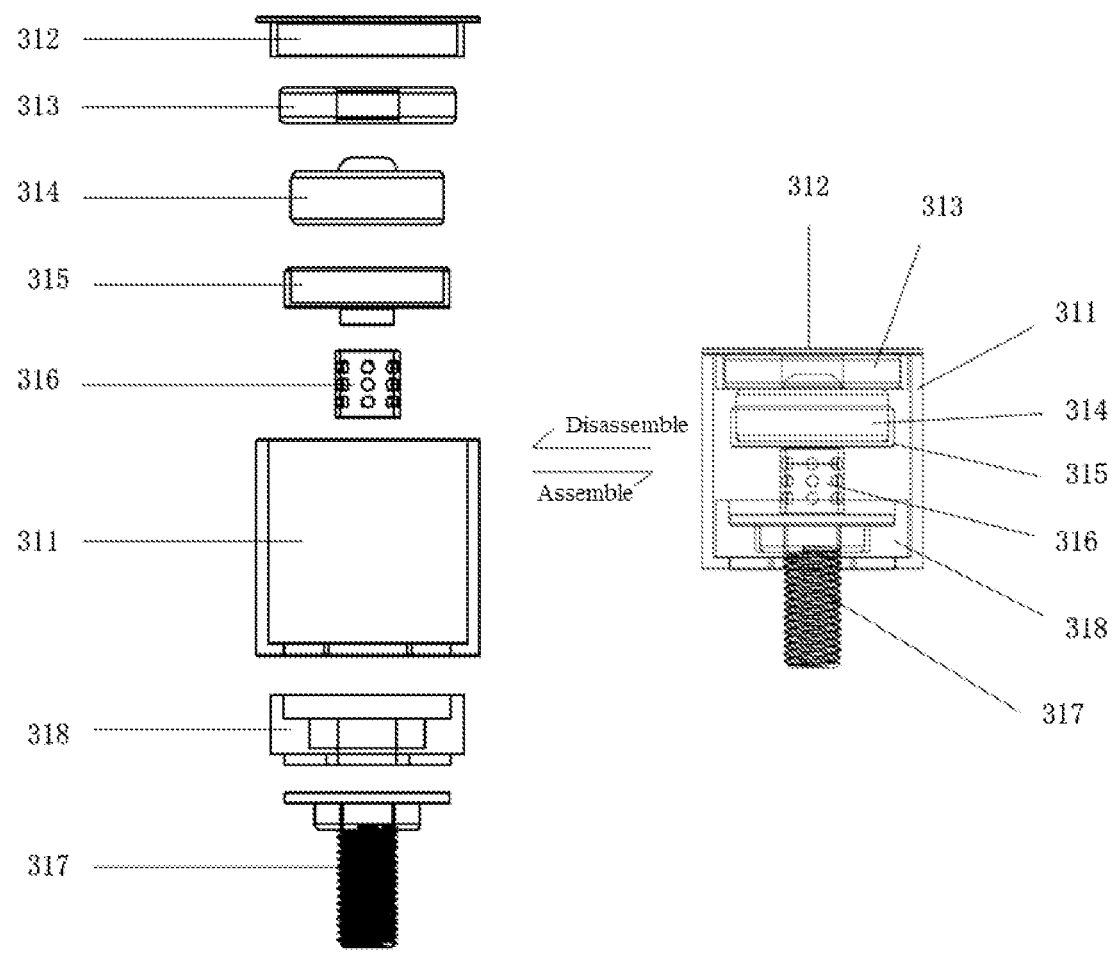
FIG. 5 is a schematic structural composition diagram of a magnetic tripping module of the lightning arrester of the present invention.
Figure 6:
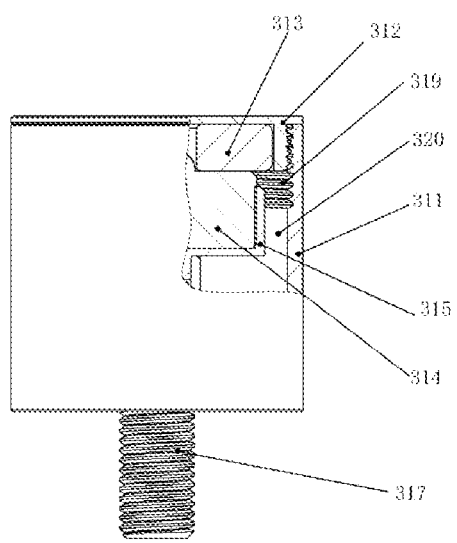
FIG. 6 is a schematic diagram of a discharge gap in the magnetic tripping module of the lightning arrester of the present invention.

As shown in FIG. 5 and FIG. 6, a magnetic tripping module includes a metal shell 311, a metal cover 312, a magnet 313, a resistor plate 314, a pot-shaped conductor plate 315, a conductive jacking member 316, a conductive connecting screw 317, and an insulated positioning pad 318. The metal shell 311 and the metal cover 312 are made of aluminum, the resistor plate 4 is a silicon carbide resistor plate, and the insulated positioning pad 318 is made of nylon.

The metal shell 311 serves as a main support of the entire structure to ensure that the entire structure will not collapse under high temperature conditions. A special-shaped hole is formed in the bottom of the metal shell 311, and has two functions: the special-shaped hole can provide a friction force required for the rotation and tightening of the conductive connecting screw 317, so that tool-free installation can be achieved; a maximum outer diameter of the special-shaped hole is smaller than a maximum outer diameter of a tail structure of the conductive connecting screw 317, which can ensure that the screw will not be pulled out or dropped from the entire magnetic tripping module after the insulated positioning pad 318 is molten at high temperature, and also ensures that the other connecting end of the conductive connecting screw will never be disconnected from the magnetic tripping module.

The top of the metal shell 311 is provided with a thread, which facilitates the installation of the metal cover 312. The structural part of the metal cover 312 includes an external thread, a magnet positioning groove and a mounting notch. The external thread functions to ensure that the metal cover 312 and the metal shell 311 can be tightly connected; the magnet positioning groove functions to ensure that an installation position of the magnet 313 is always at the center; and the mounting gap provides a clamping position for a rotary tightening tool, thereby ensuring a rotary tightening force. The magnet 313 is characterized by being provided with a central positioning hole used to ensure that the resistor plate 314 connected to the magnet 313 is positioned at the center of the structure during assembly. The resistor plate 314 is characterized by being provided with a positioning boss at the center, which ensures that the resistor plate 314 is positioned at the center of the magnet during assembly.

The pot-shaped conductor plate 315 is made of brass, and its shape is as shown in FIG. 5. The pot-shaped conductor plate 315 has two functions: 1, when a leakage voltage value is less than a certain threshold value (1 kV in this patent), a current is directed through the pot-shaped conductor plate 315 to the resistor plate 314 connected in series with the pot-shaped conductor plate 315, and at this moment, the pot-shaped conductor plate 315 functions to increase a connection area between the resistor plate 314 and the pot-shaped conductor plate 315, thereby ensuring the sufficient electric conduction; and 2, when a leakage voltage exceeds a certain threshold (1 kV in this patent), a voltage flowing through the pot-shaped conductor plate 315 will break through a 2 mm air discharge gap 320 between the pot-shaped conductor plate 315 and the metal shell 311, to perform continuous discharge on the metal shell 311, and at this moment, another parallel path is created, which makes use of and releases part of the current. This discharge process will cause the pot-shaped conductor plate 315 to instantaneously generate a high temperature greater than 1000° C. This temperature is transmitted to the magnet 313 through the resistor plate 314 to heat the magnet 313, thereby making the magnet 313 lose its magnetism within 8 seconds.

The conductive jacking member 316 is a metal flexible mechanism, which functions to tighten the entire mechanism while the conductive connecting screw 317 and the pot-shaped conductor plate 315 are conducted, thereby avoiding a gap between structural members. The conductive connecting screw 317 has two functions: 1, the conductive connecting screw is an external connecting member; and 2, when the insulated positioning pad 318 is accidentally molten by high temperature, the tail of the conductive connecting screw 317 will be hung on the special-shaped hole of the metal shell 311 to prevent the magnetic tripping module from being disconnected from other connecting parts. An inner hexagonal groove of the insulated positioning pad 318 serves as a positioning groove for the conductive connecting screw 317, and an outer hexagonal boss serves as a positioning structure of the overall mechanism, thereby preventing the screw from rotating when the entire magnetic tripping module is installed. A nylon material serves as an insulated pad for separating the conductive connecting screw 317 from the metal shell 311.

As shown in FIG. 1 and FIG. 3, the magnetic tripping module is provided inside the disengaging unit 303, and is adsorbed onto the magnet adsorption surface 118 when operating at ordinary times. The aging of the lightning arresting core results in a thermal effect inside the magnetic tripping module, such that the magnet loses its efficacy at high temperature, which makes the disconnection unit 303 automatically disconnected from the magnet adsorption surface 118. Therefore, the lightning arresting core is tripped automatically. When the lightning arrester ages, a voltage leakage will occur. When the leakage voltage is below 1 kV, part of the current on a main transmission line will flow through the fuse to the lightning arrester connected in parallel to the main transmission line, and then to the magnetic tripping module, which will eventually heat the resistor plate and the magnet, thereby achieving a purpose of actuating the magnetic tripping module. When the leakage voltage is above 1 kV, after the current flows into the magnetic tripping module, the current will be blocked when it flows through a silicon carbide valve plate. Excessive voltage will break down air between the pot-shaped conductor plate and a metal aluminum shell to form a bypass after flowing through the pot-shaped conductor plate 315, such that the pot-shaped conductor plate 315 discharges electricity to the metal shell 311. During the discharge, the pot-shaped conductor plate 315 will instantly rise to a high temperature, to heat the resistor plate 314, and finally quickly heat the magnet 313, such that the magnet loses its efficacy, thereby achieving the purpose of actuating the magnetic tripping module.

Figure 7:
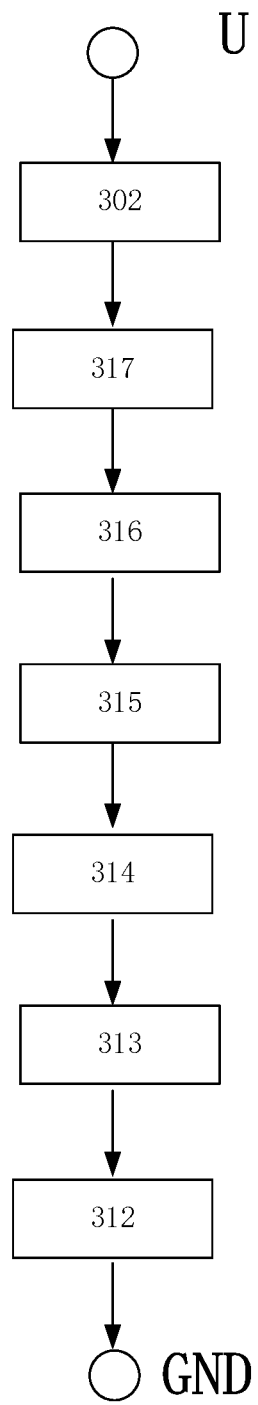
FIG. 7 is a schematic diagram of a flowing direction of a leakage current when a silicon carbide resistor plate of the present invention operates normally.

The aging of the lightning arrester is a long process, but this process is not linear and traceable. At the beginning of aging, a voltage level of leakage energy will increase with the increase of aging, without excluding the possibility of sudden aging of the lightning arrester. The aging of the lightning arrester means that its resistance value begins to decrease. As the lightning arresting core ages, a voltage loaded on the resistor plate will rise, and a leakage voltage level of 1 kV or higher will appear. The leakage voltage threshold of 1 kV is related to the thickness of the resistor plate 314 and the breakdown voltage, and is an approximate value obtained after multiple tests. In the present invention, by accurately selecting the silicon carbide material, thickness and other parameters, a withstand voltage threshold of the resistor plate is about 1 kV. When the leakage voltage loaded on the resistor plate is less than 1 kV, the leakage current will flow through the lightning arresting core 302, the conductive connecting screw 317, the conductive jacking member 316, the pot-shaped conductor plate 315, the resistor plate 314, the magnet 313 and the metal cover 312 in sequence from a high-voltage U terminal in a direction shown in FIG. 7. The resistor plate 314 operates in a normal manner and continues to generate heat, and transfers the heat to the magnet to slowly heat the magnet. After long-time accumulation, the magnet reaches a certain temperature and loses its efficacy, such that the lightning arresting core falls off.

Figure 8:
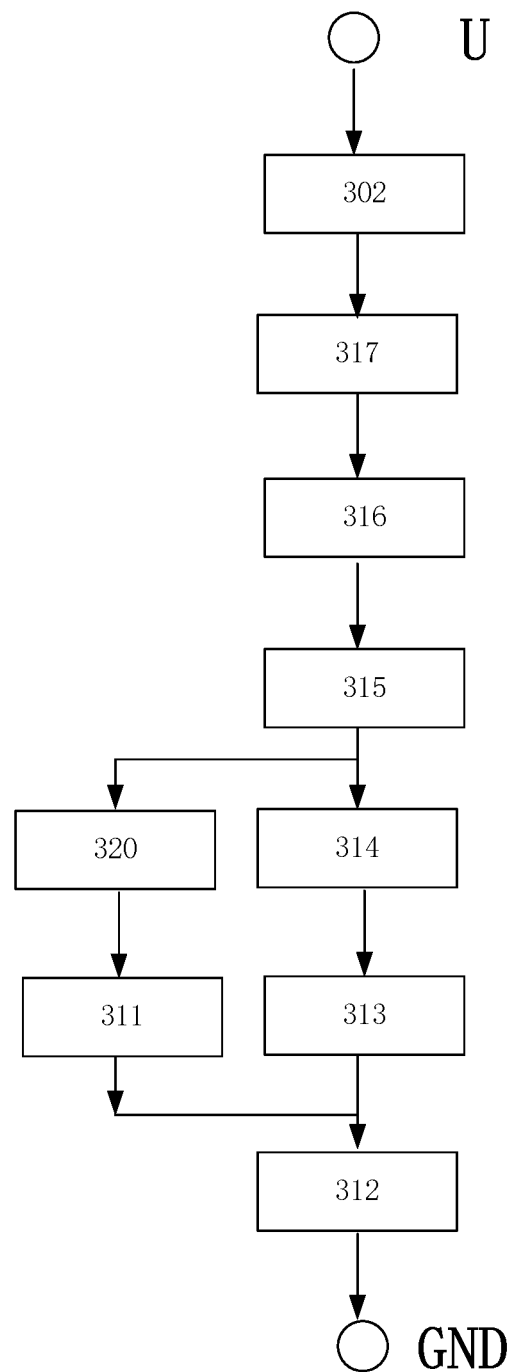
FIG. 8 is a schematic diagram of a flowing direction of a leakage current when the silicon carbide resistor plate of the present invention is broken down.

When the severe aging of the lightning arresting core leads to a sharp increase in leakage current, the leakage voltage loaded on the resistor plate is greater than 1 kV, and the resistor plate is broken down. The resistance value of the resistor plate drops sharply, and the leakage current will flow through a weak point at this time. Therefore, a 2 mm air discharge gap 320 between the pot-shaped conductor plate 315 and the metal shell 311 becomes the first choice. At this time, the voltage breaks through the air discharge gap 320, such that the current flows in a direction shown in FIG. 8, and flows through the conductive connecting screw 317, the conductive jacking member 316, and the pot-shaped conductor plate 315 in sequence from the high-voltage U terminal, with one path flowing through the broken-down resistor plate, the magnet 313 and the metal cover 312, and to a ground GND terminal; and the other path flowing through the air discharge gap 320, the metal shell 311 and the metal cover 312, and to the ground GND terminal. Therefore, the pot-shaped conductor plate 315 heats the resistor plate 314 by discharging electricity to the inner wall of the metal shell 311, and then heats the magnet 313, such that the magnet loses its magnetism quickly, thereby achieving a quick disengaging effect of the lightning arrester. A large number of tests have shown that the aged lightning arrester can fall off quickly within about 8 seconds.

Embodiment 3: Internal Anti-Falling Lightning Arrester and Lightning Arresting and Fusing Integrated Combination Device An RW series drop-out fuse and an MOA series zinc oxide lightning arrester generally need to be installed at an offline position of a 10 kV distribution network terminal to provide overcurrent and lightning protection for a distribution transformer, wherein the 10 kV distribution transformer has three phases A, B, and C at the input end, and three sets of lightning arresting and fusing combination devices are installed on three phases of lines.

A conventional drop-out fuse is adopted. The drop-out fuse is a kind of common power equipment with isolation and protection properties in the power industry, which is mainly characterized in that a melt will be fused by heat generated by a current itself when the current exceeds a fuse rating, and an internal fuse wire forms a tension with a drop-out mechanism in a fusion tube. When the wire melt is fused and loses its tension, the drop-out structure disconnect a fusion tube body from a system power supply by means of the gravity, to form an obvious disconnection distance.

Similar to Embodiment 1, the lightning arrester is made of a zinc oxide material. The lightning arrester is installed and connected between a power supply line and the earth, and is usually used in parallel with protected equipment. Once a high voltage occurs and endangers the insulation of the protected equipment, the lightning arrester immediately releases an overvoltage action to the earth and directs the high-voltage impact to the earth, thereby limiting a voltage amplitude and protecting the self insulation between a power supply cable and the equipment. When the overvoltage disappears, the lightning arrester quickly returns to its original state, allowing the power supply line to operate normally.

Figure 9:
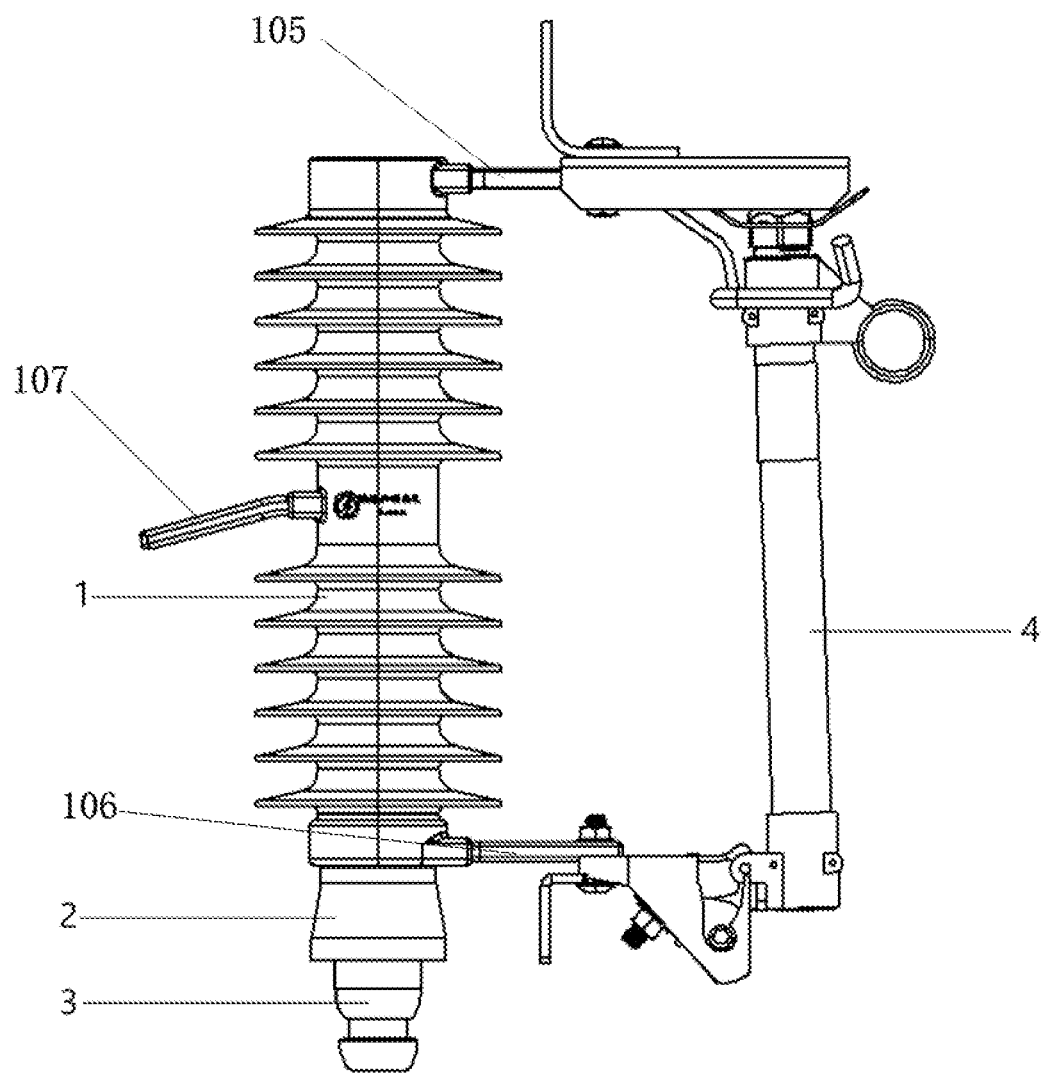
FIG. 9 is a structural composition diagram of an internal anti-falling lightning arresting and fusing combination device of the present invention.
Figure 10:
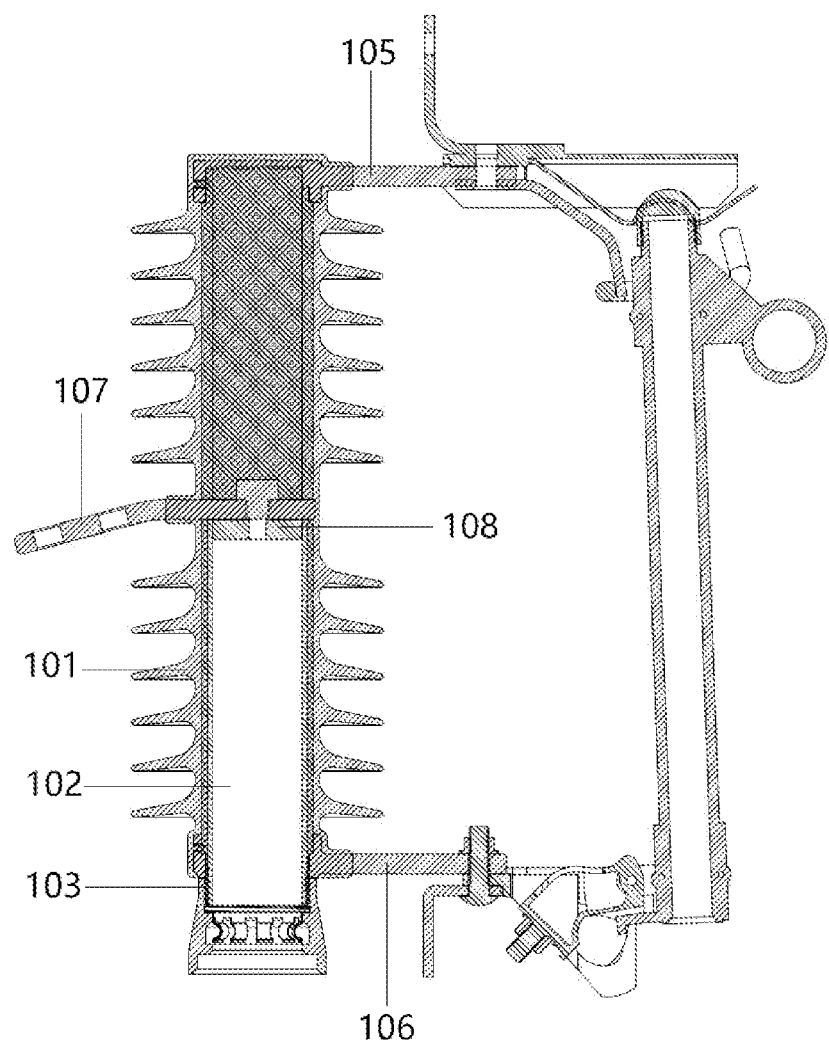
FIG. 10 is a structural diagram of an insulator main body in the internal anti-falling lightning arresting and fusing combination device.
Figure 11:
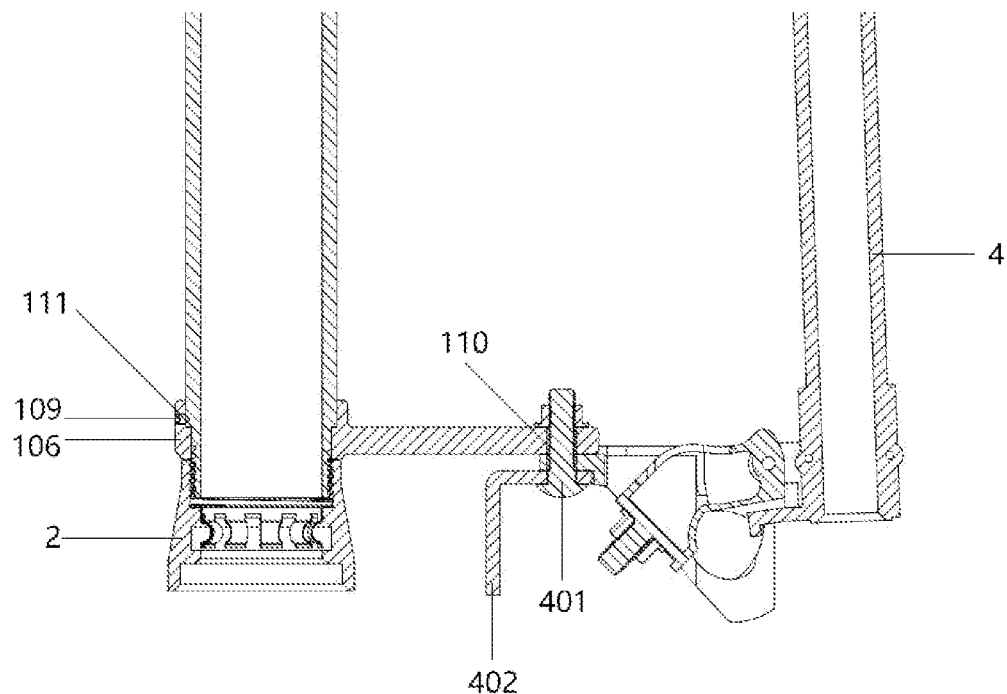
FIG. 11 is a schematic structural diagram showing an installation way of the lower end of a fuse in the internal anti-falling lightning arresting and fusing combination device of the present invention.

As shown in FIGS. 9-11, the lightning arresting and fusing combination device of the present invention includes a fuse 4, an insulator main body 1, a bell-mouth main body 2 and a lightning arrester body 3. The lightning arrester body 3 is installed inside the insulator main body 1, and the bell-mouth main body 2 is coupled to a mouth portion at the lower end of the insulator main body 1 through threads.

In FIG. 9, an upper-end fixing member 105 is connected to the upper part of the insulator main body 1 and the upper part of the fuse 4. The upper-end fixing member 105 is connected to a high-voltage wire inlet end of an external transmission line. The upper-end fixing member 105 functions as an upper-end fixing part of the fuse, has a mounting hole in which a standard fuse can be installed, and also serves as a high-voltage wire inlet end of the entire equipment.

As shown in FIG. 10 and FIG. 11, a lower-end fixing member 106 is connected to the lower part of the insulator main body 1 and the lower part of the fuse 4. The lower-end fixing member 106 serves as a lower-end fixing member of the fuse and plays a dual role of connecting a low-voltage wire outlet end and the wire inlet end of the lightning arrester. The lower-end fixing member 106 is connected to the input end of one of three phases A, B, and C of power equipment such as a transformer on the one hand, and is communicated with the lower end of the lightning arrester body 3 on the other hand.

Figure 12:
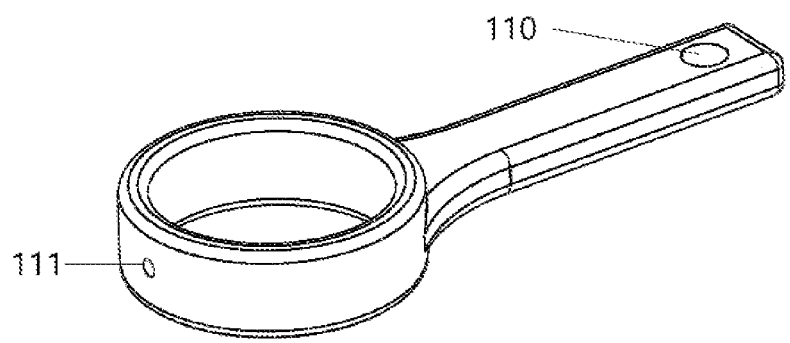
FIG. 12 is a structural diagram of a lower-end fixing member in the internal anti-falling lightning arresting and fusing combination device of the present invention.

In FIG. 12, one end of the lower-end fixing member 106 is a straight end, and the other end of the lower-end fixing member 106 is an annular end. The straight end part is provided with a fuse fixing hole 110, and coupled to the standard fuse and a fuse wire outlet end 402 through bolts 401. The annular end sleeves an insulating tube lower port 103, and is provided with a positioning hole 111. The annular end is positioned at a position set by the insulating tube lower port 103 by a positioning screw 109. The bell-mouth main body 2 is closely clung to the insulating tube lower port 103 against the annular end of the lower-end fixing member 106, in order to ensure that the lower-end fixing member 106 and the bell-mouth main body 2 are electrically conducted. The fuse and the insulator main body 1 are fixedly combined into integrated equipment by means of the upper-end fixing member 105 and the lower-end fixing member 106.

The insulator main body 1 has a sealed cylinder structure, and an intermediate fixing member 107 is provided at an outer ring in the middle of the insulator main body 1. The intermediate fixing member 107 is connected to a ground terminal of the power equipment and the earth. An iron magnet adsorption block 108 is provided in a cabin of the insulator main body 1 and fixedly connected to the intermediate fixing member 107, for adsorbing and fixing the lightning arrester body 3 at a set position inside the insulator main body. The first role of the intermediate fixing member 107 is to act as an external connecting member of the entire structure. This part has two connecting holes in one end, and may be fixed to a crossarm on an electric pole, such that the whole device can be fixed by one crossarm. The second role of the intermediate fixing member 107 is to act as a ground terminal connector of the lightning arrester. The third role of the intermediate fixing member 107 is to be connected to the magnet adsorption block 108 through a bolt to provide a firm position for fixing the magnet adsorption block 108. The upper end of the lightning arrester body 3 is adsorbed to the magnet adsorption block 108 by a magnetic force, and is connected to the intermediate fixing member 107. The magnet adsorption surface 118 is machined on the lower end surface of the magnet adsorption block 108 and configured to attract the magnet inside the disconnection unit 303.

The insulator main body 1 includes an insulating tube 102 with an upper end sealed. An outer ring of the insulating tube 102 is sleeved with an umbrella skirt main body 101. The insulating tube 102 is made of a glass fiber tube. The umbrella skirt main body 101 is made by pressing silicone rubber subjected to vulcanization treatment on the insulating tube. An outer ring of the insulating tube lower port 103 is provided with a tube bottom outer thread 104 for the fixed connection of the bell-mouth main body 2. The bell-mouth main body 2 is made of aluminum or other conductive materials. The bell-mouth main body 2 is fixed onto the insulator main body 1 by a thread at the insulating tube lower port 103, and is electrically connected to the lower-end fixing member 106. A thread, a positioning groove and a mounting hole are machined on the insulating tube 102 to provide mounting positions for all structural parts. A solid glass fiber rod is provided in the insulating tube 102 at the upper part of the intermediate fixing member 107. The solid glass fiber rod functions firstly to seal and fill the upper end portion of the insulating tube 102; and also prevents the upper-end fixing member from and the intermediate fixing member 107 from being conducted to discharge electricity.

When in use, the lightning arrester body 3 is integrally installed into the insulating tube 102, and the magnet 313 will adsorb the lightning arrester body 3 onto the magnet adsorption block 108. At this time, the lightning arrester body 3 completes the ground connection. The magnet adsorption block 108 serves as a magnet adsorption point to provide a reliable attraction force for the entire lightning arrester body 3, and at the same time serves as an intermediate point connecting the lightning arrester body 3 and a ground wire. A metal conductive part at the lower end of the lightning arrester body 3 and the bell-mouth main body 2 are conducted. At this time, the lightning arrester body 3 completes the connection of the high-voltage wire inlet end, thereby completing the installation of the entire lighting arrester body 3. The bell-mouth main body 2 is structurally characterized in that the lower end is horn-shaped. This structure facilitates the installation of the lightning arrester body 3 and provides a larger installation aperture and guiding effect. The bell-mouth main body 2 is made of aluminum, and plated with a conductive layer on its outer surface, and functions as an intermediate structure connecting the lower-end fixing member 106 and the lightning arrester body 3.

When the lightning arrester operates normally before aging, the current flows in from an upper port of the fuse 4 and flows out from a lower port of the fuse 4 in case of no overvoltage, without passing through the lightning arrester connected in parallel with the fuse 4. When an overvoltage case occurs, the overvoltage flows in from the upper port of the fuse 4 and flows to the lower-end fixing member 106 at the lower port of the fuse 4. The lower-end fixing member 106 directs the overvoltage into the bell-mouth main body 2 connected to thereto. The bell-mouth main body 2 causes the overvoltage flow to the extension rod 301 of the lightning arrester, which is connected to the bell-mouth main body 2.

The extension rod 301 directs the overvoltage into the lightning arresting core 302 connected thereto, and then into the ground through the magnetic tripping module, thereby avoiding a safety accident.

Figure 13:
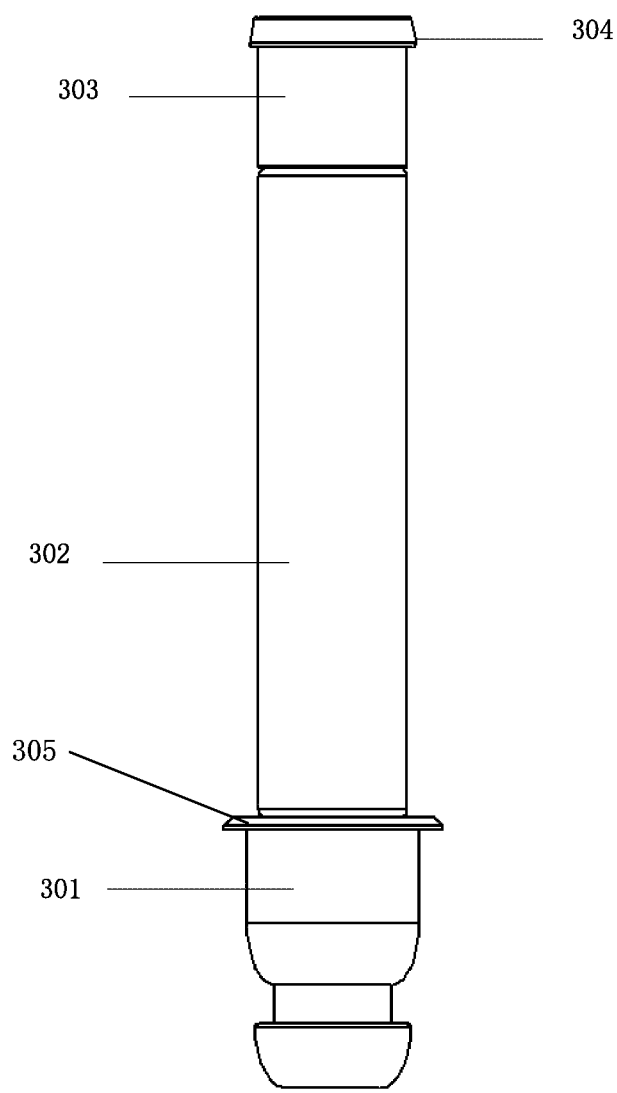
FIG. 13 is a structural diagram of an internal anti-falling lightning arrester body of the present invention.

As shown in FIG. 13, the lightning arrester body 3 includes the disconnection unit 303, the lightning arresting core 302 and the extension rod 301 which are provided from top to bottom. A brim 304 is provided at the end of the disconnection unit 303. A conductive convex ring 305 is provided between the lightning arresting core 302 and the extension rod 301. A magnet and other accessories are provided inside the disconnection unit 303. When the lightning arresting core has an aging failure, the gap discharge inside the disconnection will cause the magnet to lose its magnetism at a high temperature for a short time in the case of lightning or overvoltage, such that the lightning arrester body 3 will naturally fall off.

Figure 14:
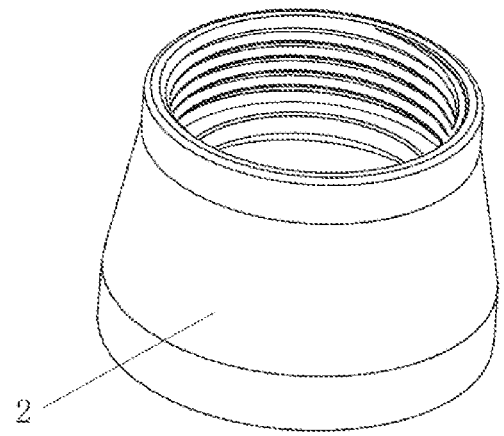
FIG. 14 is a structural diagram of a bell mouth of the internal anti-falling lightning arrester of the present invention.
Figure 15:
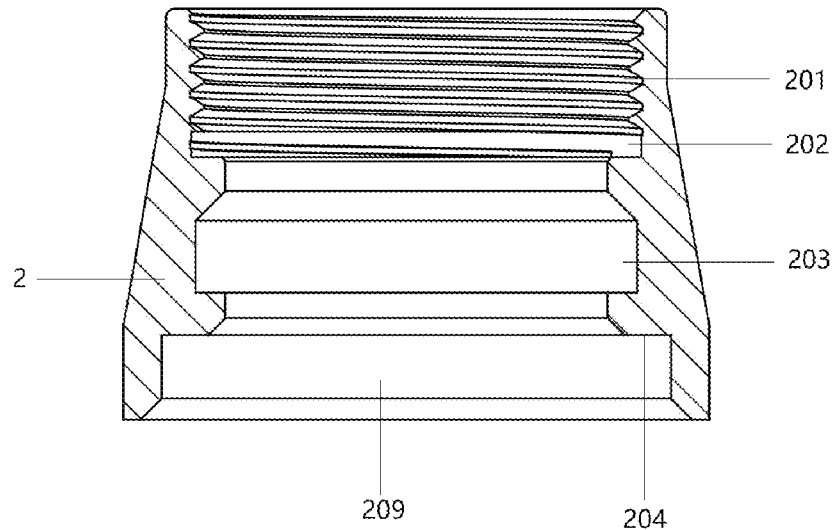
FIG. 15 is a sectional view of the bell mouth in FIG. 14.
Figure 16:
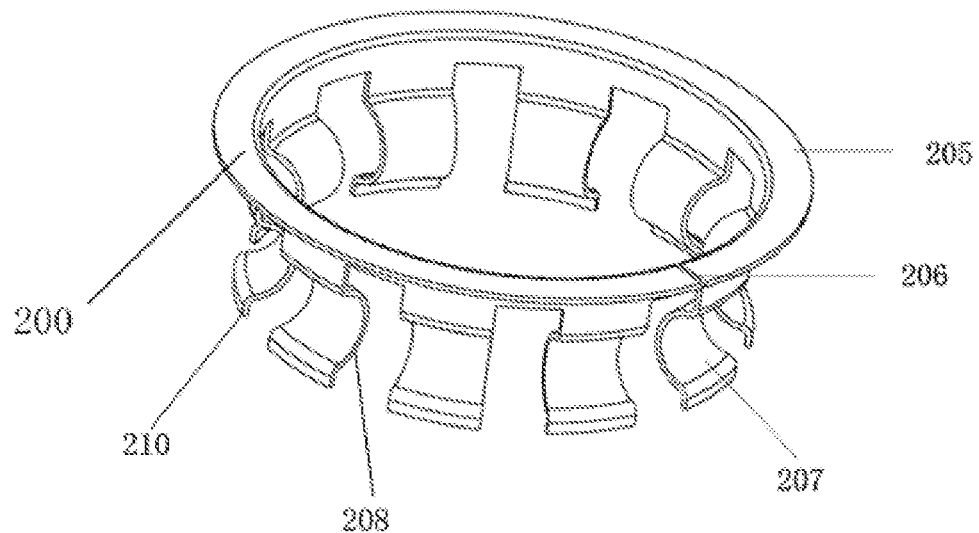
FIG. 16 is a structural diagram of a claw-shaped washer of the internal anti-falling lightning arrester of the present invention.

As shown in FIGS. 14 to 16, the outside of the bell-mouth main body 2 is of a horn structure, and a mounting thread 201, a washer mounting groove 202, a washer movable groove 203 and a conductive contact surface 204 are sequentially provided inside the bell-mouth main body 2 from top to bottom. The mounting thread 201 is matched with the tube bottom outer thread 104 at the lower part of the insulating tube in terms of parameters, and the bell-mouth main body 2 is fixed to the insulating tube lower port 103.

The washer mounting groove 202 is used to fix a claw-type washer 200. The protrusion 208 of an elastic claw 207 positionally corresponds to the washer movable groove 203. An inner diameter and a width of the washer movable groove 203 are larger than an outer diameter of the protrusion 208 respectively, which reserves a movable space for an elastic part of the elastic claw 207 to ensure its telescopic function. The upper surface of a limiting groove 209 is a conductive contact surface 204. When the lightning arrester body is installed in place, the conductive contact surface 204 and the conductive convex ring 305 on the lightning arrester body 3 are fully in contact with each other for electric conduction.

The claw-type washer 200 includes a mounting ring 205 and a plurality of elastic claws 207 provided at the lower part of the mounting ring 205. The top of each elastic claw 207 is fixedly connected to the mounting ring 205 as a whole. Each elastic claw 207 bends inward to form a protrusion 208 in the middle. A mouth portion 210 of each elastic claw has an outwardly flared structure, which facilitates the installation of the lightning arrester body 3 from below. A mounting notch 206 is provided on one side of a ring body of the mounting ring 205. The mounting notch 206 penetrates through the entire ring body and functions to provide a shrinkage structure for the mounting ring 205, thereby facilitating the installation of the claw-shaped washer 200 inside the bell-mouth main body 2.

During installation, the first step is to hold the mounting ring 205 of the claw-type washer 200 with hands, such that the mounting ring 205 partially overlaps with the mounting gap 206. Then, the claw-shaped washer 200 is fixed inside the bell-mouth main body 2 from the lower part of the bell-mouth main body 2, wherein the mounting ring 205 is fixed at the washer mounting groove 202. The second step is to fasten the bell-mouth main body 2 to the lower part of the insulator main body 1 through threads. The third step is to install the lightning arrester body 3 from the lower part of the bell-mouth main body 2. The brim 304 of the lightning arrester body 3 can overcome the elastic force of the claw-shaped washer 200 as long as it is pushed upward. At this moment, the washer movable groove 203 reserves an elastic space for the protrusion 208 of each elastic claw 207, such that the lightning arrester body 3 is installed at a set position inside the insulator main body 1.

Figure 17:
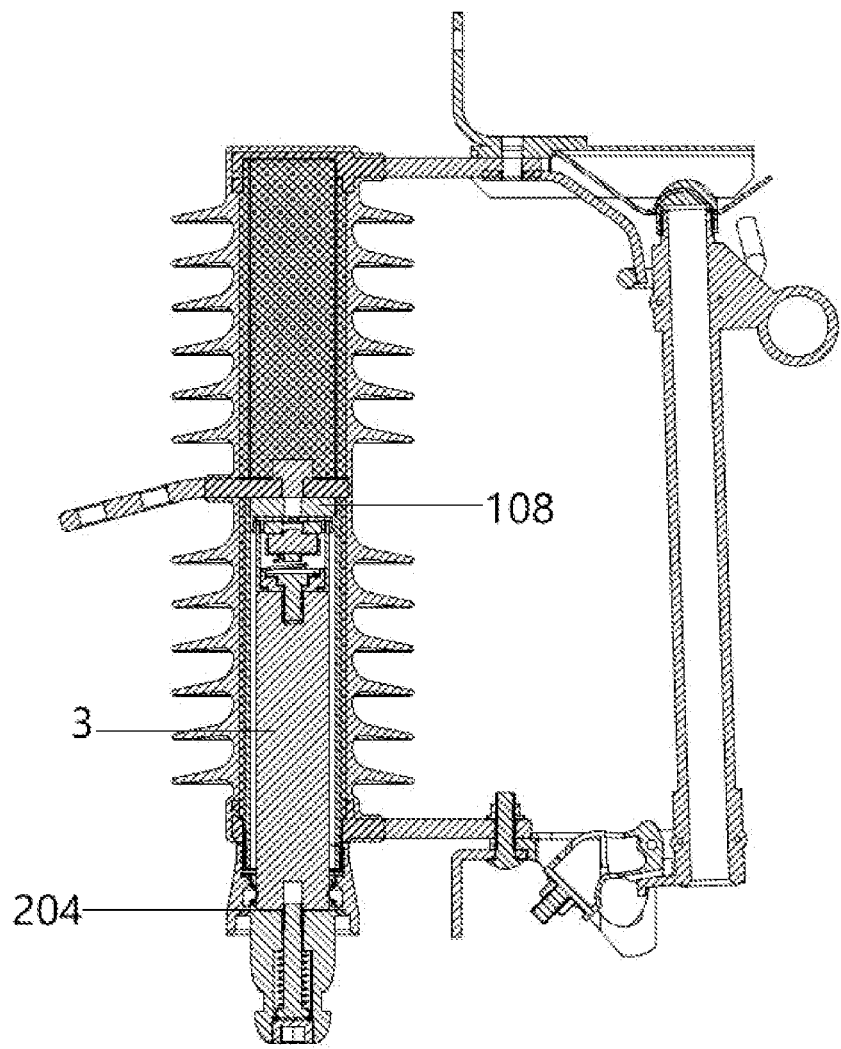
FIG. 17 is a structural diagram when the internal anti-falling lightning arrester body of the present invention is installed in situ.

As shown in FIG. 17, the top of the lightning arrester body 3 is adsorbed to the magnet adsorption block 108 arranged in the middle of the insulator by means of the magnet inside the disconnection unit 303, and meanwhile, the conductive contact surface 204 is fully in contact with the conductive convex ring 305 on the lighting arrester body 3 to conduct electricity.

Figure 18:
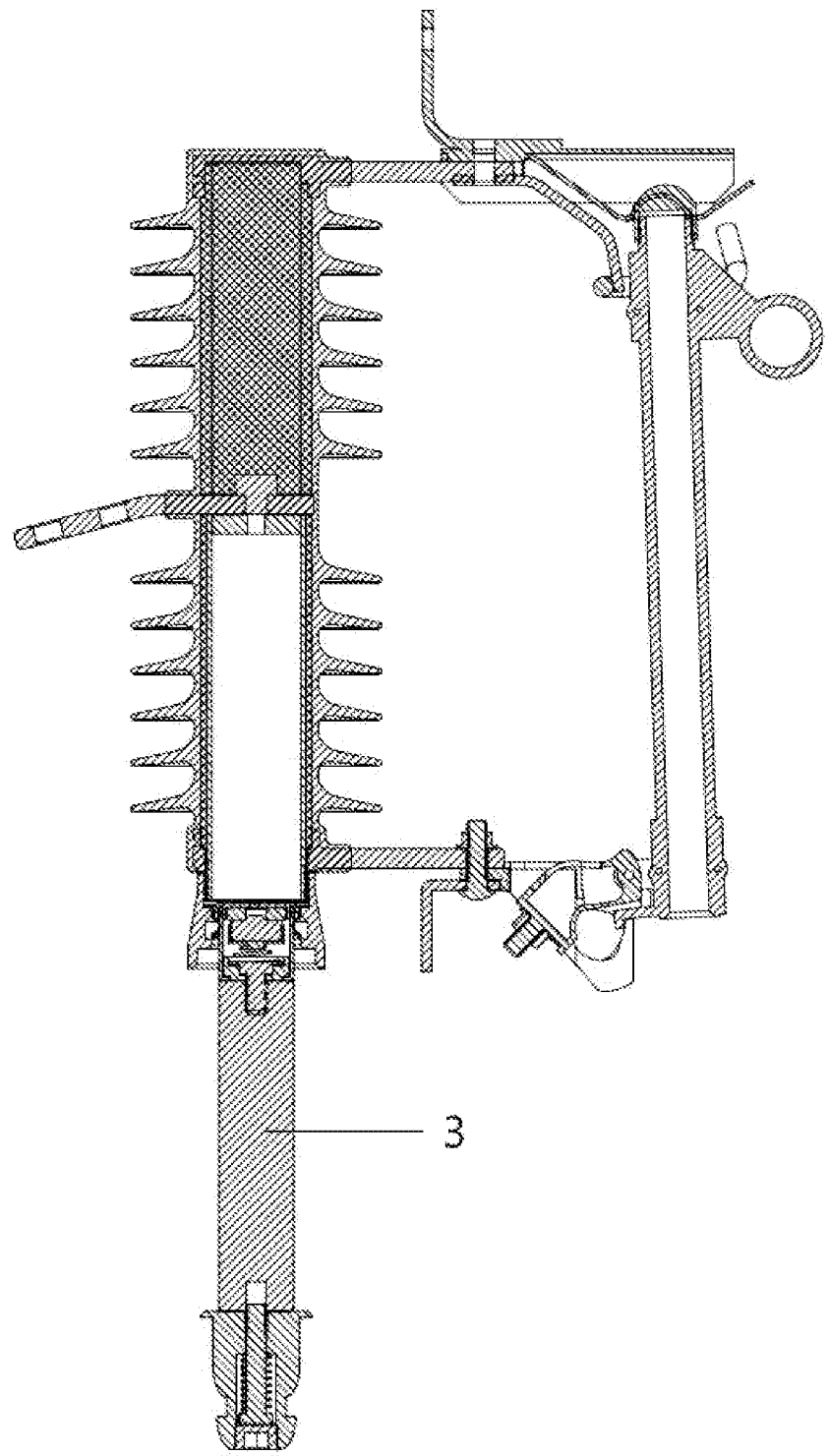
FIG. 18 is a state diagram when the internal anti-falling lightning arrester of the present invention falls off.
Figure 19:
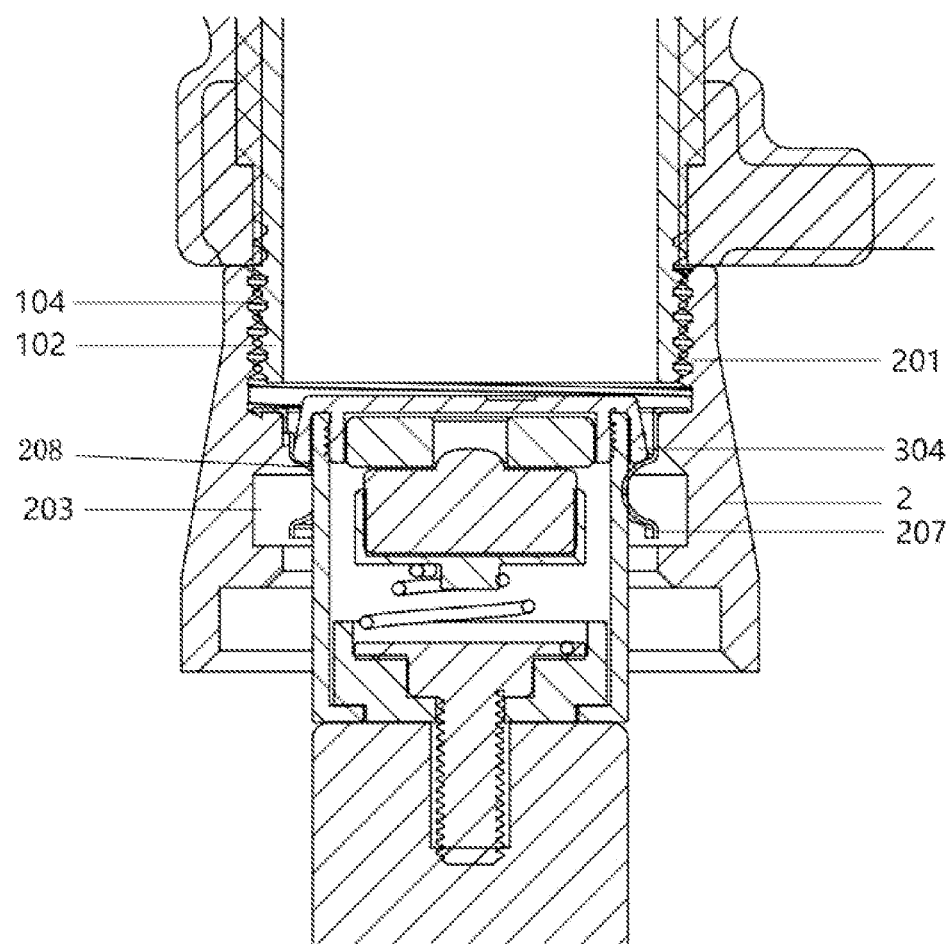
FIG. 19 is a structural diagram when a mounting ring is installed in the bell mouth in the case that the internal anti-falling lightning arrester of the present invention falls off.

As shown in FIG. 18 and FIG. 19, when the aged lightning arrester body 3 falls off from the inside of the insulator main body 1, the brim 304 of the lightning arrester body 3 is just stuck on the protrusions 208 of the elastic claws 207, and the protrusions 208 provide resistance to prevent the brim 304 from passing through. An operator sleeves the lower end of the lightning arrester body with a device, and applies a downward pulling force to deform the elastic claws 207, such that the brim 304 passes through the bell-mouth main body 2, thereby realizing the disassembly of the lightning arrester body 3, The lighting arrester body 3 can be replaced by repeating the above steps.

For a person of ordinary skill in the art, various changes, modifications, substitutions and modifications made to these embodiments, without departing from the principle and spirit of the present invention, still fall within the protection scope of the present invention.

The invention claimed is:

1. An automatic tripping and anti-falling lightning arrester, comprising an insulator main body (1), a lightning arrester body (3) and an anti-falling member, wherein the insulator main body (1) further comprising a sealed cylinder structure, and a magnet adsorption surface (118) inside the insulator main body (1);
the lightning arrester body (3) further comprising a disconnection unit (303) and a lightning arresting core (302) respectively arranged from a top to a bottom, and the lightning arrester body (3) is located inside the insulator main body (1);
the disconnection unit (303) further comprising a magnetic tripping module wherein a magnet (313) is provided, and wherein the disconnection unit (303) is adsorbed onto the magnet adsorption surface (118) when during operation;
wherein aging of the lightning arresting core results in a thermal effect inside the magnetic tripping module, which makes the disconnection unit (303) disconnected from the magnet adsorption surface (118); and
wherein the anti-falling member is provided on the insulator main body (1), and configured to support and prevent the lightning arrester body (3) from falling off when the lightning arrester body (3) is disconnected from a working position and falls off.

2. The automatic tripping and anti-falling lightning arrester according to claim 1, wherein the magnetic tripping module further comprising a metal shell (311), the magnet (313), a resistor plate (314) and a pot-shaped conductor plate (315) sequentially stacked in the metal shell (311) from a top to a bottom, wherein the resistor plate (314) is adjacent to the pot-shaped conductor plate (315), wherein a discharge gap (320) is formed between an outer wall of the pot-shaped conductor plate (315) and an inner wall of the metal shell (311).

3. The automatic tripping and anti-falling lightning arrester according to claim 2, wherein the magnetic tripping module further comprising a conductive jacking member (316), a conductive connecting screw (317) and an insulated positioning pad (318), sequentially arranged in the metal shell (311) and located at a lower part of the pot-shaped conductor plate (315), wherein a lower end of the conductive connecting screw (317) passes through the insulated positioning pad (318) and the bottom of the metal shell (311) and extends to an outside of the metal shell, and wherein a metal cover (312) is mounted on a top of the metal shell (311).

4. The automatic tripping and anti-falling lightning arrester according to claim 2, wherein the discharge gap (320) is 2 mm.

5. The automatic tripping and anti-falling lightning arrester according to claim 2, wherein the resistor plate (314) is a silicon carbide resistor plate.

6. The automatic tripping and anti-falling lightning arrester according to claim 1, wherein a conductive convex ring (305) is provided on an outer ring at a middle and a lower part of the lightning arrester body (3), wherein the anti-falling member is a hook anti-falling component provided on one side of a bottom end of the insulator main body (1), and wherein when the lightning arrester body (3) falls off, the hook anti-falling component hooks onto a lower end of the conductive convex ring (305) to prevent the lightning arrester body (3) from falling off.

7. The automatic tripping and anti-falling lightning arrester according to claim 6, wherein the hook anti-falling component further comprising a fixed bracket (505) and an anti-falling fixing member (506) that are integrally connected to each other, wherein the fixed bracket (505) sleeves a lower port (103) of an insulating tube at a lower end of the insulator main body (1), and wherein a movable hook (508) is movably connected to a lower end of the anti-falling fixing member (506) through a torsion spring (582) and a hook bolt (581).

8. The automatic tripping and anti-falling lightning arrester according to claim 1, wherein a brim (304) is provided at an outer ring on a top of the lightning arrester body (3), wherein the anti-falling member further comprising a bell-mouth main body (2) and a claw-type washer (200), wherein the bell-mouth main body (2) is coupled to a lower port (103) of an insulating tube at a lower end of the insulator main body (1), wherein a claw-shaped washer (200) is provided inside the bell-mouth main body (2), wherein the claw-type washer (200) further comprising a mounting ring (205) and wherein a plurality of elastic claws (207) are provided at a lower part of the mounting ring (205), wherein a top of each elastic claw (207) is fixedly connected with the mounting ring (205), wherein each elastic claw (207) bends inward and forms a protrusion (208), wherein the protrusion (208) is capable of blocking the brim (304) when the lightning arrester body (3) falls off.

9. The automatic tripping and anti-falling lightning arrester according to claim 8, wherein a mounting notch (206) is provided on one side of a ring body of the mounting ring (205) and penetrates through the entire ring body.

10. The automatic tripping and anti-falling lightning arrester according to claim 8, wherein a washer mounting groove (202) and a washer movable groove (203) are respectively arranged inside the bell-mouth main body (2) from a top to a bottom, wherein the mounting ring (205) of the claw-shaped washer (200) is mounted in the washer mounting groove (202), and wherein the washer movable groove (203) corresponds to the protrusion (208).

11. The automatic tripping and anti-falling lightning arrester according to claim 8, wherein a conductive convex ring (305) is provided on the outer ring at a middle and a lower part of the lightning arrester body (3), wherein a limiting groove (209) is formed inside the bell-mouth main body (2), and wherein a conductive contact surface (204) at an upper part of the limiting groove (209) is in contact with the conductive convex ring (305).

12. The automatic tripping and anti-falling lightning arrester according to claim 1, wherein an upper umbrella skirt sealing member (602) is provided at a top end of the insulator main body (1), wherein the magnet adsorption surface (118) is formed on a lower end surface of the upper umbrella skirt sealing member (602), and wherein the disconnection unit (303) at an upper end of the lightning arrester body (3) is adsorbed onto the magnet adsorption surface (118).

13. The automatic tripping and anti-falling lightning arrester according to claim 11, wherein an upper umbrella skirt sealing member (602) is coupled to a top end of the insulator main body (1) through threads.

14. The automatic tripping and anti-falling lightning arrester according to claim 11, wherein an upper-end connecting member (601) is provided at top end of an upper umbrella skirt sealing member (602), and wherein a wire inlet end (612) is provided on the upper-end connecting member (601).

15. The automatic tripping and anti-falling lightning arrester according to claim 1, wherein an intermediate fixing member (107) is provided on an outer ring of the insulator main body (1), wherein a magnet adsorption block (108) is provided inside the insulator main body (1) and fixed on the intermediate fixing member (107), wherein the magnet adsorption surface (118) is formed on a lower end surface of the magnet adsorption block (108), wherein the disconnection unit (303) at an upper end of the lightning arrester body (3) is adsorbed onto the magnet adsorption surface (118).

16. The automatic tripping and anti-falling lightning arrester according to claim 1, wherein an intermediate fixing member (107) is fastened to a crossarm on an electric pole and connected to a ground terminal.

17. The automatic tripping and anti-falling lightning arrester according to claim 1, wherein the insulator main body (1) further comprising an insulating tube (102) which is sleeved with an umbrella skirt main body (101), and wherein an insulating tube lower port (103) is provided at a lower end of the umbrella skirt main body (101).

18. A lightning arresting and fusing integrated combination device, comprising a fuse and the automatic tripping and anti-falling lightning arrester according to claim 1, wherein an upper-end fixing member (105) is coupled to an upper part of the insulator main body (1) and an upper part of the fuse (4), and wherein the upper-end fixing member (105) is connected with a high-voltage wire inlet end of an external power transmission line.

19. The lightning arresting and fusing integrated combination device according to claim 18, wherein a lower-end fixing member (106) is connected to a lower part of the insulator main body (1) and a lower part of the fuse (4), wherein the lower-end fixing member (106) is fixed between an insulating tube lower port (103) and a bell-mouth main body (2), and wherein the lower-end fixing member (106) is connected with a low-voltage wire outlet end of the external power transmission line and a wire inlet end of the lightning arrester.

* * * * *